United States Patent
Ortelt et al.

(10) Patent No.: US 10,280,252 B2
(45) Date of Patent: *May 7, 2019

(54) LATENT EPOXY RESIN FORMULATIONS FOR LIQUID IMPREGNATION PROCESSES FOR PRODUCTION OF FIBRE COMPOSITE MATERIALS

(71) Applicant: Evonik Degussa GmbH, Essen (DE)

(72) Inventors: Martina Ortelt, Flein (DE); Dirk Fuchsmann, Haltern am See (DE); Eike Langkabel, Wegberg (DE); Britta Kohlstruk, Gladbeck (DE); Jaclyn Balthasar, Glinde (DE)

(73) Assignee: Evonik Degussa GmbH, Essen (DE)

( * ) Notice: Subject to any disclaimer, the term of this patent is extended or adjusted under 35 U.S.C. 154(b) by 13 days.

This patent is subject to a terminal disclaimer.

(21) Appl. No.: 15/375,792

(22) Filed: Dec. 12, 2016

(65) Prior Publication Data

US 2018/0162991 A1    Jun. 14, 2018

(30) Foreign Application Priority Data

Dec. 11, 2015 (EP) .................................... 15199599

(51) Int. Cl.
| | |
|---|---|
| B32B 27/26 | (2006.01) |
| B32B 27/38 | (2006.01) |
| C08J 5/24 | (2006.01) |
| C08L 63/00 | (2006.01) |
| C08G 59/50 | (2006.01) |
| C08J 5/04 | (2006.01) |
| C08G 59/56 | (2006.01) |
| C08G 59/22 | (2006.01) |
| F03D 1/06 | (2006.01) |

(52) U.S. Cl.
CPC ......... *C08G 59/506* (2013.01); *C08G 59/226* (2013.01); *C08G 59/504* (2013.01); *C08G 59/5026* (2013.01); *C08G 59/56* (2013.01); *C08J 5/04* (2013.01); *C08J 5/24* (2013.01); *C08J 2363/00* (2013.01); *C08J 2363/02* (2013.01); *F03D 1/0675* (2013.01); *F05B 2280/6003* (2013.01); *F05B 2280/6015* (2013.01); *Y02E 10/721* (2013.01)

(58) Field of Classification Search
None
See application file for complete search history.

(56) References Cited

U.S. PATENT DOCUMENTS

| | | | | |
|---|---|---|---|---|
| 3,901,833 | A | * | 8/1975 | Flynn ...................... C03C 25/36 524/904 |
| 4,746,718 | A | * | 5/1988 | Gardner ............. C08G 59/5033 525/471 |
| 2008/0027169 | A1 | | 1/2008 | Ortelt |
| 2011/0190419 | A1 | | 8/2011 | Wittenbecher et al. |
| 2011/0319564 | A1 | * | 12/2011 | Corley ............... C08G 59/5006 525/132 |
| 2014/0107255 | A1 | | 4/2014 | Wittenbecher et al. |
| 2015/0344406 | A1 | | 12/2015 | Kasemi et al. |
| 2017/0166687 | A1 | * | 6/2017 | Ortelt ................. C08G 59/3227 |
| 2017/0166688 | A1 | * | 6/2017 | Ortelt ................... C08G 59/502 |

FOREIGN PATENT DOCUMENTS

| | | | |
|---|---|---|---|
| DE | 26 40 408 A1 | 3/1978 | |
| DE | 26 40 409 A1 | 3/1978 | |
| EP | 2 752 403 A1 | 7/2014 | |
| GB | 1568183 A * | 5/1980 | .......... C08G 59/184 |
| GB | 1568725 A * | 6/1980 | .......... C08G 59/506 |
| WO | WO 2005/111135 A1 | 11/2005 | |
| WO | WO 2010/010048 A1 | 1/2010 | |

OTHER PUBLICATIONS

European Search Report dated Mar. 14, 2016 in patent application No. 15199599.0 with English translation of categories of cited documents.

* cited by examiner

*Primary Examiner* — Michael J Feely
(74) *Attorney, Agent, or Firm* — Grüneberg and Myers PLLC

(57) ABSTRACT

Latent epoxy resin formulations are suitable for liquid impregnation processes for production of fiber composite materials.

20 Claims, No Drawings

LATENT EPOXY RESIN FORMULATIONS FOR LIQUID IMPREGNATION PROCESSES FOR PRODUCTION OF FIBRE COMPOSITE MATERIALS

BACKGROUND OF THE INVENTION

Field of the Invention

The invention provides epoxy compositions consisting of at least one resin component and at least one hardener component, the composition being suitable as a thermoset matrix for production of semi-finished fibre-matrix products and hardened fibre-matrix laminates, called composites.

Discussion of the Background

The invention provides epoxy compositions consisting of at least one resin component and at least one hardener component, the composition being suitable as a thermoset matrix for production of semi-finished fibre-matrix products and hardened fibre-matrix laminates, called composites.

Epoxy compositions consisting of at least one epoxy resin and at least one hardener, for example amines, anhydrides or dicyandiamide, have long been known and are used in fields of application such as coatings, composites or flooring, for example.

In this context, composites are understood to mean composite materials composed of fibres and polymer matrix.

In the context of increasing demands for efficient utilization of scarce resources, lightweight construction solutions are gaining increased attention in a wide variety of different industries. Whenever masses have to be moved, fibre composite materials/composites are an option of interest, since these offer high specific stiffnesses and strengths coupled with low weight. For this reason, composites have been established in aviation for decades, and without fibre composite material technologies even rotor blades for wind turbines, for example, would not be conceivable. Because of their excellent profile of properties, these materials are also gaining increasing attention in automobile construction. In all 3 market segments mentioned, components of high mechanical strength are required, as achievable by means of continuous fibre-reinforced polymer materials. However, the geometries of these components are becoming ever more demanding (for example, the length of the rotor blades of wind turbines is constantly increasing in order to be able to "harvest" a maximum amount of wind energy), with a simultaneous demand for ever higher productivity.

In the context of this invention, the term "composites" is particularly used synonymously with the terms "composite components", "composite material", "fibre composite material", "composite mouldings", "fibre-reinforced plastics" or "fibre-reinforced components", "prepregs", "semi-finished fibre-matrix product", "SMC" (sheet moulding compound), "SMC composites" (semi-finished SMC fibre-matrix products), "CFK", "GFK" and "FVK".

Processes for producing composites can be divided into single-stage methods, for example RTM (resin transfer moulding) and VARTM (vacuum-assisted resin transfer moulding), and multistage methods, for example prepreg technology and SMC (sheet moulding compounds).

The route via semi-finished fibre products (for example textile fabrics based on glass fibres or carbon fibres and impregnated with prepolymers, prepregs) in a multistage method has advantages. Particularly in the field of continuous fibre-reinforced structure components, prepreg technology, because of the excellent wetting quality of the fibres by the resin matrix, offers access to components of extremely high mechanical quality, which is the reason why prepreg technology has already been established for many years in aerospace as the most important processing method for production of composite components. However, semi-finished fibre products, by their nature, are two-dimensional sheetlike structures, which does indeed restrict their applicability to the production of essentially two-dimensional or three-dimensional components having limited geometric complexity, for example wing or tail assembly components. Prepreg technology is also an established process in the production of rotor blades for wind turbines.

By contrast, continuous fibre-reinforced composite components having three-dimensional geometries of high complexity are produced by the RTM method. This method is characterized in that what are called near net shape preforms are first produced from textile fabrics. This involves preforming non-resin-impregnated fibre products (i.e. woven fabrics, laid scrims, nonwoven fabrics, etc. as supplied) to three-dimensional structures in near net shape form and at the same time bonding the individual laminas for fixing, or sewing them in the case of particularly complex parts. This pure fibre preform is then introduced into a cavity and, in the closed cavity, for example a heated steel mould, impregnated with a solvent-free liquid resin formulation and, in the closed cavity, cured through immediately to give the final state (one-stage method). The flow geometries that occur, some of which are of high complexity, require low-viscosity resins having long pot lives in order to be able to efficiently wet all fibre filaments. Accordingly, the resin systems used for the purpose are of low reactivity and require long hardening times at high temperatures. After the hardening, the finished component is demoulded and processed further if necessary, for example deburred.

However, the one-stage RTM method as described above is technically impossible or not economically implementable in the manufacture of components having very large dimensions, for example rotor blades for wind turbines, or in the manufacture of prototypes in small numbers of articles (excessive weight of the steel moulds and/or excessively high costs). Use is made here of various liquid impregnation methods (vacuum infusion methods, max. pressure 1 bar) in an open-mould version, as described, for example, in F. Henning/E. Moeller "Handbuch Leichtbau" [Handbook of Lightweight Construction], Carl-Hanser-verlag, p. 641 ff. The moulds consist of the lower half only and may, as well as metallic materials, also be manufactured from composite materials; the structures composed of the reinforcing fibres to be impregnated and any other prefabricated components or core materials in these methods are sealed at the top with a vacuum film. The application of reduced pressure produces pressure differences of not more than 1 bar, which is the reason why the resin systems employed in infusion methods have to have very low viscosity and long processing times. Typically, the flow paths in the manufacture of large parts are long and the flow rate is low because of the small pressure difference.

Solvent-free epoxy resin compositions of low reactivity that are suitable for this purpose are known, for example the EPIKOTE™ Resin MGS™ RIMR235 resin system with EPIKURE™ Curing Agent MGS™ RIMH233, RIMH235-237 from Hexion.

Documents DE 2640408, DE 2640409, DE 2540410, DE 2950067 and DE 3328134 describe 2,2,6,6-tetramethyl-4-piperidylamine (triacetonediamine or TAD for short) as a latent amine for hardening of epoxy resins. Possible applications mentioned therein are surface coatings with emphasis on powder coatings, but also moulding compositions which can optionally be reinforced by fibres or other substances. Examples include combinations of pure TAD and epoxy resins. However, these systems harden exclusively under hot conditions and are not usable at hardening temperatures of 70 to 80° C., as are standard in the manufacture of large parts in the open-mould method, for example rotor blades for wind turbines.

SUMMARY OF THE INVENTION

Problem Addressed by the Invention

The performance of a composite is defined not only by the profile of properties of the resin matrix chosen and of the reinforcing fibres, but very particularly also by the quality of the fibre-matrix composite. A high composite quality requires the resin matrix to faultlessly wet all reinforcing fibres. In the manufacture of very large parts such as rotor blades of wind turbines, the resin formulation has to overcome long flow paths under pressures of not more than 1 bar in the vacuum infusion method. An additional factor is that the structures to be impregnated, composed of reinforcing fibres, prefabricated parts and core materials, frequently also have high wall thicknesses as well as their complexity. These layers have to be penetrated and wetted completely and without defects by the liquid resin formulation.

In view of the demand for the production of ever higher proportions of renewable energy, the dimensions of rotor blades of wind turbines are becoming ever greater. Thus, conventional epoxy resin formulations as specified above are approaching the limits of their processibility, and there is a need for epoxy resin formulations which are "open" for a much longer period, i.e. are of low viscosity for much longer and are free-flowing at these low viscosities, in order to wet all fibres in the quality required, but there must not be any significant rise in the cycle time for reasons of productivity and there must be no development of high exothermic temperature peaks in the resin reservoir (resin stock) over the course of the infusion.

Solution

It has been found that, surprisingly, the epoxy resin composition according to the invention can be adjusted within a wide range such that it meets the demands for a longer processing time; for example, it is possible to increase the time until attainment of critical temperatures in the resin stock by 40% and the time until attainment of the viscosity limit of 1000 mPas by 12%. The hardening at 70° C. gives glass transition temperatures of ≥70° C. with conversions of ≥95%, which meets the demands, for example according to GL (Germanischer Lloyd), for rotor blades.

DETAILED DESCRIPTION OF THE INVENTION

The epoxy resin composition according to the invention, for efficient liquid impregnation processes for production of three-dimensional components, has the following advantageous properties:

low viscosity the required flow paths are correspondingly of low viscosity for a sufficient period for all fibres to be faultlessly impregnated through-hardening after impregnation of all fibres under the conditions chosen, in order to assure the required productivity no development of exothermic temperature peaks, which can lead to onset of breakdown of the resin system and/or cracking as a result of buildup of stress in the composite meets all demands on mechanical, thermal and media stability and has good surface properties.

The invention provides an epoxy resin composition comprising:

A) at least one epoxy compound and

B) a hardener composition consisting of:

B1) 5%-65% by weight of at least one polyamine based on triacetonediamine and

B2) 35%-95% by weight of at least one further diamine and/or polyamine, where the stoichiometric ratio of the epoxy groups of A) and the number of active hydrogen atoms of the functional groups of B) varies from 1:0.5 to 1:1.1, preferably 1:0.6 to 1:1.05, more preferably 1:0.95 to 1:1.05, C) optionally at least one hardening accelerator, where the amounts of A)-C) add up to 100% by weight, D) optionally further additives.

Component A) Suitable components A) are epoxy compounds. Suitable epoxy compounds are described, for example, in EP 675 185.

Useful compounds are a multitude of those known for this purpose that contain more than one epoxy group, preferably two epoxy groups, per molecule. These epoxy compounds may either be saturated or unsaturated and be aliphatic, cycloaliphatic, aromatic or heterocyclic, and also have hydroxyl groups. They may additionally contain such substituents that do not cause any troublesome side reactions under the mixing or reaction conditions, for example alkyl or aryl substituents, ether moieties and the like. They are preferably glycidyl ethers which derive from polyhydric phenols, especially bisphenols and novolacs, and which have molar masses based on the number of epoxy groups ME ("epoxy equivalent weights", "EV value") between 100 and 1500, but especially between 150 and 250, g/eq.

Examples of polyhydric phenols include: resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulphone inter alia, and the chlorination and bromination products of the aforementioned compounds, for example tetrabromobisphenol A. Very particular preference is given to using liquid diglycidyl ethers based on bisphenol A and bisphenol F having an epoxy equivalent weight of 150 to 200 g/eq.

It is also possible to use polyglycidyl ethers of polyalcohols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Further useful components A) include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenol)methane. The poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

In addition, it is also possible to use polyglycidyl esters of polycarboxylic acids which are obtained by the reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Mention should additionally be made of glycidyl esters of unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized mono-unsaturated hydrocarbons (butylene oxide, cyclohexene oxide, styrene oxide), in proportions by mass of up to 30% by weight, preferably 10% to 20% by weight, based on the mass of the polyglycidyl ethers.

A detailed enumeration of the suitable epoxy compounds can be found in the handbook "Epoxidverbindungen and Epoxidharze" [Epoxy Compounds and Epoxy Resins] by A. M. Paquin, Springer Verlag, Berlin 1958, Chapter IV, and in Lee Neville "Handbook of Epoxy Resins", 1967, Chapter 2.

Useful epoxy compounds preferably include glycidyl ethers and glycidyl esters, aliphatic epoxides, diglycidyl ethers based on bisphenol A and/or bisphenol F, and glycidyl methacrylates. Other examples of such epoxides are triglycidyl isocyanurate (TGIC, trade name: ARALDIT 810, Huntsman), mixtures of diglycidyl terephthalate and triglycidyl trimellitate (trade name: ARALDIT PT 910 and 912, Huntsman), glycidyl esters of Versatic acid (trade name: CARDURA E10, Shell), 3,4-epoxycyclohexylmethyl 3',4'-epoxycyclohexanecarboxylate (ECC), ethylhexyl glycidyl ether, butyl glycidyl ether, pentaerythrityl tetraglycidyl ether (trade name: POLYPDX R 16, UPPC AG), and other Polypox products having free epoxy groups.

It is also possible to use mixtures of the epoxy compounds mentioned.

Particularly preferred epoxy components are polyepoxides based on bisphenol A diglycidyl ether, bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1,2,3-triol triglycidyl ether, pentaerythritol tetraglycidyl ether and diglycidyl hexahydrophthalate. According to the invention, it is also possible with preference to use mixtures of these epoxy compounds as component A).

The amount of component A) is guided by the composition of component B) and is calculated such that the stoichiometric ratio of the epoxy groups of A) and the number of active hydrogen atoms of the functional groups of B) varies from 1:0.5 to 1:1.1, preferably 1:0.6 to 1:1.05, more preferably 1:0.95 to 1:1.05. This means that one epoxy group from A) reacts per hydrogen atom in the amino group from B).

Component B1)

Polyamines based on triacetonediamine B1) are generally known from the literature. Components B1) used are preferably the following amines based on triacetonediamine: 2,2,6,6-tetramethyl-4-aminopiperidine (TAD), hexamethyl-enebis(4-amino-2,2,6,6-tetramethylpiperidine), N-butyl-4-amino-2,2,6,6-tetramethylpiperidine, N,N-dimethylaminopropyl-4-amino-2,2,6,6-tetramethylpiperidine, N-propyl-4-amino-2,2,6,6-tetramethylpiperidine, N-isopropyl-4-amino-2,2,6,6-tetramethylpiperidine, N-hydroxyethyl-4-amino-2,2,6,6-tetramethylpiperidine, N-methoxyethyl-4-amino-2,2,6,6-tetramethylpiperidine, N-methoxyethyl-4-amino-2,2,6,6-tetramethylpiperidine, N',N'-dimethylaminoethyl-4-amino-2,2,6,6-tetramethylpiperidine, N-morpholinoethyl-4-amino-2,2,6,6-tetramethylpiperidine, N-piperazinoethyl-4-amino-2,2,6,6-tetramethylpiperidine, 4-morpholino-2,2,6,6-tetramethylpiperidine.

It is also possible to use mixtures of the aforementioned amines based on triacetonediamine B1).

Preference is given to using 2,2,6,6-tetramethyl-4-aminopiperidine (TAD) and/or hexamethylenebis-(4-amino-2,2,6,6-tetramethylpiperidine).

The amount of component B1) used is generally 5%-65% by weight, preferably 25%-55% by weight, more preferably 35%-45% by weight, based on the total amount of B1) and B2).

Component B2)

Suitable compounds B2) are in principle those diamines and polyamines containing at least 2 amino groups. Diamines and polyamines can also be used in mixtures with amino alcohols or polymercaptans.

Di- or polyamines B2) are known in the literature. These may be monomeric, oligomeric and/or polymeric compounds. Monomeric and oligomeric compounds are preferably selected from the group of diamines, triamines, tetramines. The amine group of the di- or polyamines B2) may be attached to a primary, secondary or tertiary carbon atom, preferably to a primary or secondary carbon atom.

Components B2) used may be the following amines, alone or in mixtures:

aliphatic amines, such as the polyalkylenepolyamines, preferably selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4- trimethylhexamethylenediamine, 2-methylpentanediamine, hexamethylenediamine, N-(2-aminoethyl)ethane-1,2-diamine, N-(3-aminopropyl)propane-1,3-diamine, N,N''-1,2-ethanediylbis(1,3-propanediamine), dipropylenetriamine, adipic dihydrazide, hydrazine;

oxyalkylenepolyamines selected from polyoxypropylenediamine and polyoxypropylenetriamine (e.g. Jeffamine® D-230, Jeffamine® D-400, Jeffamine® T-403, Jeffamine® T-5000), 1,13-diamino-4,7,10-trioxatridecane, 4,7-dioxadecane-1,10-diamine;

cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine (3(4),8(9)-bis (aminomethyl)tricyclo[5.2.1.0$^{2,6}$]decane), 4-methylcyclohexane-1,3-diamine araliphatic amines such as xylylenediamines;

aromatic amines selected from phenylenediamines, phenylene-1,3-diamine, phenylene-1,4-diamine, 4,4'-diaminodiphenylmethane, 2,4'-diaminodiphenylmethane, 2,2'-diaminodiphenylmethane, alone or in mixtures of the isomers;

adduct hardeners which are the reaction products of epoxy compounds, especially glycidyl ethers of bisphenol A and F, with excess amine;

polyamidoamine hardeners which are obtained by condensation of mono- and polycarboxylic acids with polyamines, especially by condensation of dimer fatty acids with polyalkylenepolyamines;

Mannich base hardeners which are obtained by reaction of mono- or polyhydric phenols with aldehydes, especially formaldehyde, and polyamines;

Mannich bases, for example based on phenol and/or resorcinol, formaldehyde and m-xylylenediamine, and also N-aminoethylpiperazine and blends of N-aminoethylpiperazine with nonylphenol and/or benzyl alcohol, phenalkamines which are obtained in a Mannich reaction from cardanols, aldehydes and amines.

It is also possible to use mixtures of the aforementioned di- or polyamines as component B2).

Preference is given to using diamines as component B2), selected from isophoronediamine (3,5,5-trimethyl-3-aminomethylcyclohexylamine, IPD), 4,4'-diaminodicyclohexylmethane, 2,4'-diaminodicyclohexylmethane, 2,2'-diaminodicyclohexylmethane (also referred to as PACM), alone or in mixtures of the isomers, oxyalkylenepolyamines selected from polyoxypropylenediamine and polyoxypropylenetriamine, adduct hardeners based on the reaction products of epoxy compounds and the aforementioned amines B2) or combination of the aforementioned amines B2). It is also possible to use mixtures of these compounds.

Particular preference is given to using, as B2), isophoronediamine (3,5,5-trimethyl-3-aminomethylcyclohexylamine, IPD), and/or a combination of isophoronediamine and/or PACM (isomer mixture of 4,4'-, 2,4'- and 2,2'-diaminodicyclohexylmethane) and polyoxypropylenediamine and/or polyoxypropylenetriamine, and/or adduct hardeners based on the reaction products of epoxy compounds and the aforementioned amines B2) or combination of the aforementioned amines B2).

Very particular preference is given to using, as component B2),
a) isophoronediamine (3,5,5-trimethyl-3-aminomethylcyclohexylamine, IPD),
b) and/or a combination of isophoronediamine and polyoxypropylenediamine and/or polyoxypropylenetriamine,
c) and/or adduct hardeners based on the reaction products of epoxy compounds and the aforementioned amines B2) or combination of the aforementioned amines B2).

The ratio of the components in b), isophoronediamine: polyoxypropylenepolyamine and/or polyoxypropylenetriamine, is generally 10:90% to 90:10% by weight, and preferably 20:80% to 40:60% by weight.

According to the invention, amino alcohols can be used as a further component to the diamines and polyamines in mixtures in component B2). Examples of amino alcohols include monoethanolamine, 3-amino-1-propanol, isopropanolamine, aminoethoxyethanol, N-(2-aminoethyl)ethanolamine, N-ethylethanolamine, N-butylethanolamine, diethanolamine, 3-(hydroxyethylamino)-1-propanol, isophorone amino alcohol and diisopropanolamine. Amino alcohols can be used alone or as mixtures of two or more amino alcohols together with di- or polyamines as component B2).

According to the invention, polymercaptans can also be used as a further component to the diamines and polyamines in mixtures in component B2). Examples of mercaptans, also called thiols, include ethanethiol, dithiothreitol, dithioerythritol, glyceryl dithioglycolate, glycol dimercaptoacetate, trimethylolpropane trimercaptoacetate, pentaerythritol tetramercaptoacetate, glycol di(3-mercaptopropionate), trimethylolpropane tri(3-mercaptopropionate), pentaerythritol tetra(3-mercaptopropionate), dipentaerythritol hexa(3-mercaptopropionate), ethoxylated trimethylolpropane tri(3-mercaptopropionate) (product name: Thiocure ETTMP 1300), tris[2-(3-mercaptopropionyloxy)ethyl] isocyanurate. Further mercaptans are described, for example, in EP394495A1, U.S. Pat. No. 4,775,733A1 and WO2007096425A2. Mercaptans can be used alone or as mixtures of two or more mercaptans together with di- or polyamines as component B2).

In addition to the di- and polyamines mentioned, it is possible to use the di- and polyamines together with polyphenols as component B2). Examples of these are mentioned in "Epoxy Resins—Chemistry and Technology; Curing Agents and Modifiers; p. 481-482, 2nd edition 1988". Polyphenols can be used alone or as mixtures of two or more polyphenols together with di- or polyamines as component B2).

The amount of component B2) used is generally 35%-95% by weight, preferably 45%-75% by weight, more preferably 55%-65% by weight, based on the total amount of B1) and B2).

Component C) Hardening Accelerators

In addition, catalysts for the epoxy-amine reaction may optionally be added. Suitable accelerators are described in: H. Lee and K. Neville, *Handbook of Epoxy Resins*, McGraw-Hill, New York, 1967. According to the invention, 0.1% to 10% by weight, preferably 0.1% to 5% by weight, more preferably 0.5% to 2.0% by weight, of at least one hardening accelerator is used.

Examples of suitable accelerators are organic acids such as salicylic acid, dihydroxybenzoic acid, trihydroxybenzoic acid, methylsalicylic acid, 2-hydroxy-3-isopropylbenzoic acid or hydroxynaphthoic acids, lactic acid and glycolic acid, tertiary amines such as benzyldimethylamine (BDMA), 1,4-diazabicyclo[2.2.2]octane (DABCO), triethylamine, N,N'-dimethylpiperazine or aminoethylpiperazine (AEP), hydroxylamines such as dimethylaminomethylphenol, bis(dimethylaminomethyl)phenol, 2,4,6-tris(dimethylaminomethyl)phenol (Ancamine K54), urons such as 3-(4-chlorophenyl)-1,1-dimethylurea (monuron), 3-(3,4-dichlorophenyl)-1,1-dimethylurea (diuron), 3-phenyl-1,1-dimethylurea (fenuron), 3-(3-chloro-4-methylphenyl)-1,1-dimethylurea (chlortoluron), tetraalkylguanidines such as N,N,N,N'-tetramethylguanidine (TMG), imidazole and imidazole derivatives such as 1H-imidazole, 1-methylimidazole, 2-methylimidazole, 1-benzyl-2-methylimidazole, 2-ethyl-4-methylimidazole, 2-phenylimidazole, 2-phenyl-4-methylimidazole, 1-vinylimidazole, 1-(2-hydroxyethyl)imidazole, 1,2-dimethylimidazole, 1-cyanoethylimidazole and the suitable salts thereof, phenol and phenol derivatives such as t-butylphenol, nonylphenol, bisphenol A or bisphenol F, and organic or inorganic salts and complexes such as methyltriphenylphosphonium bromide, calcium nitrate (Accelerator 3130), or carboxylates, sulphonates, phosphonates, sulphates, tetrafluoroborates or nitrates of Mg, Ca, Zn and Sn. Particular preference is given to the group of the tertiary amines.

Component D) Additives

The composition of the invention may optionally comprise additives. Additives are understood to mean substances which are generally added in order to alter the properties of the epoxy composition in the desired direction, for example to match viscosity, wetting characteristics, stability, reaction rate, blister formation, storability or adhesion, and also use properties, to the end use. Suitable additives are described, for example, in WO 99/55772, p. 15-25, and in "Plastics Additives, R. Gächter and H. Müller, Hanser Publishers 1983". These can be added to component A) or B).

For example, it is possible to add light stabilizers, for example sterically hindered amines, or other auxiliaries as described, for example, in EP 669 353 in a total amount of 0.05% to 5% by weight.

For the production of the reactive compositions of the invention, it is additionally possible to add additives such as levelling agents, for example polysilicones, or adhesion promoters, for example those based on acrylate. In addition, still further components may optionally be present.

Auxiliaries and additives used in addition may be chain transfer agents, plasticizers, stabilizers and/or inhibitors.

In addition, it is possible to add dyes, nanoscale fillers, tougheners (toughness improvers), mould release agents, flame retardants, pigments, desiccants, wetting, dispersing and levelling auxiliaries, adhesion promoters, UV stabilizers, defoamers and rheology additives.

The invention also provides for the use of an epoxy resin composition comprising:
A) at least one epoxy compound
and
B) a hardener composition consisting of:
B1) 5%-65% by weight of at least one polyamine based on triacetonediamine
and
B2) 35%-95% by weight of at least one further diamine and/or polyamine,
where the stoichiometric ratio of the epoxy groups of A) and the number of active hydrogen atoms of the functional groups of B) varies from 1:0.5 to 1:1.1, preferably 1:0.6 to 1:1.05, more preferably 1:0.95 to 1:1.05,
C) optionally at least one hardening accelerator,
where the amounts of A)-C) add up to 100% by weight,
D) optionally further additives,
for production of composites.

The invention also provides composite components, formed essentially from
1) at least one fibrous carrier and optionally core materials and
2) an epoxy resin composition comprising:
A) at least one epoxy compound
and
B) a hardener composition consisting of:
B1) 5%-65% by weight of at least one polyamine based on triacetonediamine
and
B2) 35%-95% by weight of at least one further diamine and/or polyamine,
where the stoichiometric ratio of the epoxy groups of A) and the number of active hydrogen atoms of the functional groups of B) varies from 1:0.5 to 1:1.1, and is preferably 1:0.6 to 1:1.05, more preferably 1:0.95 to 1:1.05,
C) optionally at least one hardening accelerator,
where the amounts of A)-C) add up to 100% by weight,
D) optionally further additives.

Fibrous Carriers

The fibrous carrier material used with preference in accordance with the invention is characterized in that the fibrous carriers consist for the most part of glass, carbon, plastics such as polyamide (aramid) or polyester, natural fibres, or mineral fibre materials such as basalt fibres or ceramic fibres, individually or of mixtures, or of multiple plies of various types.

The fibrous carriers take the form of sheetlike textile structures made from nonwoven fabric, of knitted fabric including loop-formed and loop-drawn knits, of non-knitted structures such as woven fabrics, laid scrims or braids, or of long-fibre or short-fibre materials, individually or of multiple plies of various types.

The detailed execution is as follows: The fibrous carrier in the present invention consists of fibrous material (also often called reinforcing fibres). Any material that the fibres consist of is generally suitable, but preference is given to using fibrous material made of glass, carbon, plastics such as polyamide (aramid) or polyester, natural fibres, or mineral fibre materials such as basalt fibres or ceramic fibres (oxidic fibres based on aluminium oxides and/or silicon oxides). It is also possible to use mixtures of fibre types, for example woven fabric combinations of aramid and glass fibres, or carbon and glass fibres.

Mainly because of their relatively low cost, glass fibres are the most commonly used fibre types. In principle, all types of glass-based reinforcing fibres are suitable here (E glass, S glass, R glass, M glass, C glass, ECR glass, D glass, AR glass, or hollow glass fibres).

Carbon fibres are generally used in high-performance composites, where another important factor is the lower density compared to glass fibre with simultaneously high strength. Carbon fibres are industrially produced fibres composed of carbonaceous starting materials which are converted by pyrolysis to carbon in a graphite-like arrangement. A distinction is made between isotropic and anisotropic types: isotropic fibres have only low strengths and lower industrial significance; anisotropic fibres exhibit high strengths and rigidities with simultaneously low elongation at break. Natural fibres refer here to all textile fibres and fibrous materials which are obtained from plant and animal material (for example wood fibres, cellulose fibres, cotton fibres, hemp fibres, jute fibres, flax fibres, sisal fibres and bamboo fibres). Similarly to carbon fibres, aramid fibres exhibit a negative coefficient of thermal expansion, i.e. become shorter on heating. Their specific strength and their modulus of elasticity are markedly lower than those of carbon fibres. In combination with the positive coefficient of expansion of the matrix resin, it is possible to produce components of high dimensional stability. Compared to carbon fibre-reinforced plastics, the compressive strength of aramid fibre composites is much lower. Known brand names for aramid fibres are Nomex® and Kevlar® from DuPont, or Teijinconex®, Twaron® and Technora® from Teijin. Particularly suitable and preferred carriers are those made of glass fibres, carbon fibres, aramid fibres or ceramic fibres. The fibrous material is a sheetlike textile structure. Suitable materials are sheetlike textile structures made from nonwoven fabric, and likewise knitted fabric including loop-formed and loop-drawn knits, but also non-knitted fabrics such as woven fabrics, laid scrims or braids. In addition, a distinction is made between long-fibre and short-fibre materials as carriers. Likewise suitable in accordance with the invention are rovings and yarns. In the context of the invention, all the materials mentioned are suitable as fibrous carriers. An overview of reinforcing fibres is contained in "Composites Technologies", Paolo Ermanni (Version 4), script for lecture at ETH Zürich, August 2007, Chapter 7.

Core Materials

Suitable core materials are, for example: honeycomb structures based on impregnated paper, aramid fibres or lightweight metals, e.g. aluminium, foams based on lightweight metals or thermoplastic or thermoset polymer materials such as polyurethanes, polyolefins, polystyrene, polymethacrylimide (PMI), e.g. Rohacell®, phenolic resins or cyanate resins, and wood materials, e.g. balsa wood.

The invention also provides a process for producing composites by the process steps of:

I. providing a composition comprising
   A) at least one epoxy compound
   and
   B) a hardener composition consisting of:
   B1) 5%-65% by weight of at least one polyamine based on triacetonediamine
   and
   B2) 35%-95% by weight of at least one further diamine and/or polyamine,
   where the stoichiometric ratio of the epoxy groups of A) and the number of active hydrogen atoms of the functional groups of B) varies from 1:0.5 to 1:1.1, preferably 1:0.6 to 1:1.05, more preferably 1:0.95 to 1:1.05,
   C) optionally at least one hardening accelerator, where the amounts of A)-C) add up to 100% by weight,
   D) optionally further additives;
II. impregnating a structure composed of fibrous carriers and optionally further core materials with the composition from I. in a form or in a mould by a liquid resin impregnation method or impregnating fibrous carriers and gaps on a mandrel,
III. hardening the reactive composition to give the composite component and
IV. demoulding the finished component from the mould.

The invention especially also provides for the use of the composites produced in accordance with the invention in boat- and shipbuilding, in aerospace technology, in automobile construction, for two-wheeled vehicles, preferably motorcycles and pedal cycles, in the automotive, construction (for example pipes), vessel construction, medical technology and sports sectors, the electrical and electronics industry, and especially energy generation installations such as wind turbines.

More particularly, the epoxy compositions according to the invention are suitable for production of rotor blades of wind turbines.

Having generally described this invention, a further understanding can be obtained by reference to certain specific examples which are provided herein for purposes of illustration only, and are not intended to be limiting unless otherwise specified.

EXAMPLES

The feedstocks utilized in the examples which follow are elucidated in Table 1.

TABLE 1

Feedstocks

| Trade name | Supplier | Chemical name | Abbreviation |
|---|---|---|---|
| Triacetone-diamine | Evonik Industries | 2,2,6,6-Tetramethyl-4-aminopiperidine | TAD |
| VESTAMIN® IPD | Evonik Industries | 3-Aminomethyl-3,5,5-trimethylcyclohexylamine | IPD |
| Jeffamine® D230 | Huntsman | Polyoxypropylenediamine | D230 |
| D.E.R.® 351 | Dow Chemical | Epoxy resin formed from bisphenol A/bisphenol F and epichlorohydrin | — |
| D.E.R.® 731 | Dow Chemical | Butanediol diglycidyl ether | — |

Description of the analysis methods utilized in the examples which follow:

Viscosity Rise, Isothermal
Instrument: Rheotec Rheometer RC 30
Measurement system: EWS30-CC25 DIN/FTK with MB30-CC25 DIN/FTK cup
Amount used: 16 g
Temperature control: Julabo F33-ME refrigerated circulator
Temperature Rise of Resin/Hardener Formulations
Instrument: Yokogawa 4153 3-channel µP recorder
Thermocouples: NiCr—Ni-200° C. to 1370° C.
Amount used: 900 g
Temperature control: Julabo F33-ME refrigerated circulator
Procedure: The thermocouple is positioned in the middle of the mixture about 1.5 cm away from the base. The temperature profile is recorded as the temperature-time curve.
DSC
Instrument: Mettler DSC 1
Parameters: Temperature −30 to +250° C., heating rate 10 K/min
Determination of glass transition temperature (Tg):
Half step-height method, midpoint DIN 51007
Determination of conversion:

$$100 - \left( \frac{\text{exothermic heat flow after hardening} \times 100}{\text{exothermic heat flow before hardening}} \right)$$

Example 1

In an appropriate stirred vessel, a mixture composed of 50 g of Vestamin® IPD, 100 g of triacetonediamine, 100 g of Jeffamine® D230, 730 g of D.E.R. 351 and 80 g of D.E.R.

731 was made up and mixed intimately at 1200-1800 rpm in a Hauschild Speedmixer, model DAC 600.1 VAC-P. Thereafter, the rise in viscosity of this epoxy resin composition was determined isothermally with the Rheotec RC30 rheometer at 30° C.

In addition, the temperature rise was determined at 23° C.

In addition, a screening of hardening was conducted. For this purpose, 5 g of the epoxy resin composition were weighed into an aluminium pan (diameter 50 mm) and the sample was hardened in an air circulation drying cabinet at 70° C. for 6 h. Subsequently, conversion and Tg were determined by DSC (Mettler DSC 1 machine). The heating rate was 10 K/min from −30 to 250° C. All the results are shown in Table 2.

Example 2 (Non-Inventive)

In the same way as in Example 1, a mixture composed of 75 g of Vestamin® IPD, 175 g of Jeffamine® D230, 718 g of D.E.R. 351 and 80 g of D.E.R. 731 was made up in an appropriate stirred vessel and mixed intimately at 1200-1800 rpm in a Hauschild Speedmixer, model DAC 600.1 VAC-P. This epoxy resin composition was used in the same way as in Example 1 to conduct experiments on the viscosity rise at 30° C., on the temperature rise at 23° C., and a screening of hardening. This formulation does exhibit a good evolution of Tg, but reaches viscosities of 1000 mPas at 30° C. more quickly and hence has a smaller processing window. Critical temperatures in the reservoir stock are also attained much more quickly, which would lead to premature stoppage of the impregnation process. These results too are shown in Table 2.

Example 3 (Non-Inventive)

In the same way as in Example 1, a mixture composed of 250 g of triacetonediamine, 720 g of D.E.R. 351 and 80 g of D.E.R. 731 was made up in an appropriate stirred vessel and mixed intimately at 1200-1800 rpm in a Hauschild Speedmixer, model DAC 600.1 VAC-P. This epoxy resin composition was used in the same way as in Example 1 to conduct experiments on the viscosity rise at 30° C., on the temperature rise at 23° C., and a screening of hardening. This formulation does exhibit a very broad processing window (1000 mPas are attained only after 4 h at 30° C.), and relatively high temperatures in the resin stock do not occur at all. However, the evolution of Tg under the conditions of hardening at 70° C. is completely unsatisfactory, and so a purely TAD-based hardener composition does not give finished components that meet the demands. These results too are shown in Table 2.

TABLE 2

| | Example 1 | Example 2 (non-inventive) | Example 3 (non-inventive) |
|---|---|---|---|
| Rise in viscosity @ 30° C.: | | | |
| Starting viscosity | 173 mPas | 189 mPas | 174 mPas |
| Time to 1000 mPas | 202 min | 180 min | 242 min |
| Temperature rise @ 23° C., | | | |
| 900 g batch Time to 60° C. | 240 min | 170 min | — not attained |
| Screening of hardening: | | | |
| Conversion after 6 h at 70° C. | 96% | 97% | 90% |
| Glass transition temperature | 75° C | 71° C. | 50° C. |

European patent application EP15199599 filed Dec. 11, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:
1. A composition, comprising:
an epoxy resin composition; and
optionally a further additive, wherein
said epoxy resin composition comprises:
　A) at least one epoxy compound,
　B) a hardener composition comprising:
　　B1) 5%-45% by weight of at least one polyamine based on triacetonediamine
　　and
　　B2) 55%-95% by weight of at least one further diamine and/or polyamine,
　wherein the stoichiometric ratio of the epoxy groups of A) and the number of active hydrogen atoms of the functional groups of B) varies from 1:0.5 to 1:1.1, and
C) optionally, at least one hardening accelerator,
wherein the amounts of A)-C) add up to 100% by weight of said epoxy resin composition.
2. The composition according to claim 1, wherein epoxy compound A) is at least one member selected from the group consisting of
　a saturated epoxy compound, an unsaturated epoxy compound, an aliphatic epoxy compound, a cycloaliphatic epoxy compound, an aromatic epoxy compound, and a heterocyclic epoxy compound,
wherein the epoxy compound optionally has a hydroxyl group.
3. The composition according to claim 1, wherein
epoxy compound A) is at least one member selected from the group consisting of a glycidyl ether, a glycidyl ester, an aliphatic epoxide, a diglycidyl ether based on at least one of bisphenol A and bisphenol F, and a glycidyl methacrylate.
4. The composition according to claim 1, wherein
the epoxy compound A) is at least one member selected from the group consisting of
　an epoxy resin based on bisphenol A diglycidyl ether; an epoxy resin based on bisphenol F diglycidyl ether; 4,4'-methylenebis[N,N-bis(2,3-epoxypropyl)aniline]; hexanediol diglycidyl ether; butanediol diglycidyl ether; trimethylolpropane triglycidyl ether; propane-1,2,3-triol triglycidyl ether; pentaerythritol tetraglycidyl ether; diglycidyl hexahydrophthalate; an aliphatic epoxy resin; and a cycloaliphatic epoxy resin.
5. The composition according to claim 1, wherein
component B1) is at least one member selected from the group consisting of 2,2,6,6-tetramethyl-4-aminopiperidine (TAD),
hexamethylenebis(4-amino-2,2,6,6-tetramethylpiperidine),
N-butyl-4-amino-2,2,6,6-tetramethylpiperidine,
N,N-dimethylaminopropyl-4-amino-2,2,6,6-tetramethylpiperidine,
N-propyl-4-amino-2,2,6,6-tetramethylpiperidine,
N-isopropyl-4-amino-2,2,6,6-tetramethylpiperidine,
N-hydroxyethyl-4-amino-2,2,6,6-tetramethylpiperidine,
N-methoxyethyl-4-amino-2,2,6,6-tetramethylpiperidine,
N-methoxyethyl-4-amino-2,2,6,6-tetramethylpiperidine,

N',N'-dimethylaminoethyl-4-amino-2,2,6,6-tetramethyl-piperidine,

N-morpholinoethyl-4-amino-2,2,6,6-tetramethylpiperidine,

N-piperazinoethyl-4-amino-2,2,6,6-tetramethylpiperidine, and 4-morpholino-2,2,6,6-tetramethylpiperidine.

6. The composition according to claim 1, wherein component B2) comprises at least one member selected from the group consisting of a primary diamine, a secondary diamine, a primary polyamine, and a secondary polyamine.

7. The composition according to claim 1, wherein component B2) comprises at least one of:
   a) an aliphatic amine;
   b) at least one oxyalkylenepolyamine selected from the group consisting of polyoxypropylenediamine and polyoxypropylenetriamine, 1,13-diamino-4,7,10-trioxatridecane, and 4,7-dioxadecane-1,10-diamine;
   c) at least one cycloaliphatic amine selected from the group consisting of isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine (3(4),8(9)-bis(aminomethyl)tricyclo[5.2.1.0$^{2,6}$]decane), and 4-methylcyclohexane-1,3-diamine;
   d) an araliphatic amine;
   e) at least one aromatic amine selected from the group consisting of phenylenediamines, phenylene-1,3-diamine, phenylene-1,4-diamine, 4,4'-diaminodiphenylmethane, 2,4'-diaminodiphenylmethane, and 2,2'-diaminodiphenylmethane, alone or in mixtures of the isomers;
   f) an adduct hardener which is the reaction product of an epoxy compound with excess amine;
   g) a polyamidoamine hardener which is obtained by condensation of a mono- and/or polycarboxylic acid with a polyamine;
   h) a Mannich base hardener which is obtained by reaction of a mono- and/or polyhydric phenol with an aldehyde and a polyamine;
   i) a Mannich base.

8. The composition according to claim 7, wherein said Mannich base is based on phenol and/or resorcinol, formaldehyde and m-xylylenediamine, N-aminoethylpiperazine and blends of N-aminoethylpiperazine with nonylphenol and/or benzyl alcohol, phenalkamines which are obtained in a Mannich reaction from cardanols, aldehydes and amines.

9. The composition according to claim 1, wherein component B2) comprises at least one member selected from the group consisting of isophoronediamine;
4,4'-diaminodicyclohexylmethane;
2,4'-diaminodicyclohexylmethane;
2,2'-diaminodicyclohexylmethane;
a mixture of at least two of isophoronediamine, 4,4'-diaminodicyclohexylmethane, 2,4'-diaminodicyclohexylmethane, and 2,2'-diaminodicyclohexylmethane;
polyoxypropylenediamine;
polyoxypropylenetriamine;
a mixture of poly oxypropylenediamine and polyoxypropylenetriamine;
at least one adduct based on a reaction product of an epoxy compound and at least one member selected from the group consisting of isophoronediamine; 4,4'-diaminodicyclohexylmethane; 2,4'-diaminodicyclohexylmethane; 2,2'-diaminodicyclohexylmethane; a mixture of at least two of isophoronediamine, 4,4'-diaminodicyclohexylmethane, 2,4'-diaminodicyclohexylmethane, and 2,2'-diaminodicyclohexylmethane; polyoxypropylenediamine; polyoxypropylenetriamine; and a mixture of polyoxypropylenediamine and polyoxypropylenetriamine.

10. The composition according to claim 1, wherein component B2) comprises at least one member selected from the group consisting of isophoronediamine,
a mixture of at least two members selected from the group consisting of isophoronediamine, 2,2'-diaminodicyclohexylmethane, polyoxypropylenediamine, and polyoxypropylenetriamine, and
a hardener based on a reaction product of an epoxy compound and isophoronediamine or a mixture of at least two members selected from the group consisting of isophoronediamine, 2,2'-diaminodicyclohexylmethane, polyoxypropylenediamine, and polyoxypropylenetriamine.

11. The composition according to claim 1, wherein component B2) comprises at least one member selected from the group consisting of
a) isophoronediamine,
b) a combination of isophoronediamine and at least one of polyoxypropylenediamine and polyoxypropylenetriamine, and
c) an adduct hardener based on a reaction product of an epoxy compound and isophoronediamine or a combination of isophoronediamine and at least one of polyoxypropylenediamine and polyoxypropylenetriamine.

12. The composition according to claim 1, wherein component B2) comprises a mixture of 3-aminomethyl-3,5,5-trimethylcyclohexylamine and polyoxypropylenediamine.

13. The composition according to claim 1, wherein component B) is a mixture of:
B1) 35%-45% by weight of triacetonediamine; and
B2) 55%-65% by weight of a mixture of 3-aminomethyl-3,5,5-trimethylcyclohexylamine and polyoxypropylenediamine.

14. The composition according to claim 1, wherein hardening accelerator C) is present and comprises a tertiary amine.

15. A composite, obtained from the composition according to claim 1.

16. A composite, obtained from
1) at least one fibrous carrier and optionally a core material
and
2) a composition according to claim 1.

17. A process for producing a composite according to claim 16, said process comprising:
I providing a said epoxy resin composition which is a reactive composition;
II impregnating a structure comprising the fibrous carrier and optionally a further core material with the composition from I in a form or in a mould by a liquid resin impregnation method or impregnating said fibrous carrier and a gap on a mandrel;
III hardening the reactive composition to give a composite component; and
IV demoulding the composite component from the form or mould.

18. An article, comprising the composite according to claim 16.

19. The article according to claim 18, which is an article in boat- and shipbuilding, in aerospace technology, in automobile construction, for two-wheeled vehicles, in the automotive, construction, medical technology and sports sectors, the electrical and electronics industry, and in energy generation installations.

20. The article according to claim 18, which is a rotor blade of a wind turbine.

* * * * *